(12) United States Patent
Nicholson et al.

(10) Patent No.: US 9,916,535 B2
(45) Date of Patent: Mar. 13, 2018

(54) SYSTEMS AND METHODS FOR PREDICTIVE ANALYSIS

(71) Applicant: Server Technology, Inc., Reno, NV (US)

(72) Inventors: Calvin Nicholson, Reno, NV (US); Yael Campo, Reno, NV (US); Michael Gordon, Reno, NV (US)

(73) Assignee: Server Technology, Inc., Reno, NV (US)

( * ) Notice: Subject to any disclaimer, the term of this patent is extended or adjusted under 35 U.S.C. 154(b) by 592 days.

(21) Appl. No.: 14/320,140

(22) Filed: Jun. 30, 2014

(65) Prior Publication Data

US 2015/0006440 A1    Jan. 1, 2015

Related U.S. Application Data

(60) Provisional application No. 61/841,112, filed on Jun. 28, 2013.

(51) Int. Cl.
| | | |
|---|---|---|
| *G06F 17/00* | (2006.01) | |
| *G06F 17/20* | (2006.01) | |
| *G06N 5/04* | (2006.01) | |

(52) U.S. Cl.
CPC ..................... *G06N 5/04* (2013.01)

(58) Field of Classification Search
USPC .......................................................... 706/11
See application file for complete search history.

(56) References Cited

U.S. PATENT DOCUMENTS

| | | | |
|---|---|---|---|
| 7,043,543 B2 | 5/2006 | Ewing et al. | |
| 7,099,934 B1 | 8/2006 | Ewing et al. | |
| 7,246,014 B2 * | 7/2007 | Forth | G01D 4/004 702/57 |
| 7,294,056 B2 * | 11/2007 | Lowell | G07F 17/329 463/17 |
| 7,369,950 B2 * | 5/2008 | Wall | G01D 4/004 702/57 |
| 7,522,036 B1 * | 4/2009 | Preuss | H05K 7/1457 307/150 |

(Continued)

OTHER PUBLICATIONS

Alec Brooks, Ed Lu, Dan Reicher, Charles Spirakis, and Bill Weihl, "Demand Dispatch", IEEE Power & Energy Magazine, May/Jun. 2010, pp. 21-29.*

(Continued)

*Primary Examiner* — Michael B Holmes
(74) *Attorney, Agent, or Firm* — Perkins Coie LLP

(57) ABSTRACT

Systems and methods are provided relating to predictive analysis, and more specifically to predictive analysis of one or more data types in a data center environment. The data center environment itself includes a power manager in communication with at least one cabinet power distribution unit (CDU) that is in power-supplying communication with at least one electronic appliance in an electronic equipment rack. The predictive analysis approach estimates the rate of change over a future interval of time for at least one data type based on said historical data and predicts when said at least one data type will reach an associated user-defined threshold based on said rate of change. Results can be displayed graphically on an application program associated with the power manager.

36 Claims, 9 Drawing Sheets

(56) References Cited

U.S. PATENT DOCUMENTS

| | | | |
|---|---|---|---|
| 7,706,134 B2 | 4/2010 | Ewing et al. | |
| 7,777,365 B2 | 8/2010 | Cleveland | |
| 8,080,805 B2* | 12/2011 | Gordon | H01L 31/119 250/370.09 |
| 8,201,028 B2* | 6/2012 | Sawczak | G06F 1/206 714/47.1 |
| 8,305,737 B2* | 11/2012 | Ewing | G06F 1/266 174/59 |
| 8,494,661 B2* | 7/2013 | Ewing | H04L 12/10 700/22 |
| 9,142,971 B2* | 9/2015 | Ewing | H04L 12/10 |
| 9,400,724 B2* | 7/2016 | Jasrasaria | G06F 11/2094 |
| 9,509,742 B2* | 11/2016 | Gordon | H04N 21/23439 |
| 9,537,522 B2* | 1/2017 | Ewing | H04B 1/3827 |
| 9,703,342 B2* | 7/2017 | Nicholson | G06F 1/266 |
| 2011/0245988 A1* | 10/2011 | Ingels | G06F 1/26 700/295 |
| 2013/0238795 A1* | 9/2013 | Geffin | G06F 1/206 709/224 |

OTHER PUBLICATIONS

Data center air management metrics—practical approach Robert Tozer; Munther Salim 2010 12th IEEE Intersociety Conference on Thermal and Thermomechanical Phenomena in Electronic Systems Year: 2010 pp. 1-8 IEEE Conference Publications.*

Wind turbine spindle condition monitoring based on operational data Zhao-guang Wang; Peng Guo 2017 29th Chinese Control and Decision Conference (CCDC) Year: 2017 pp. 1435-1440 IEEE Conference Publications.*

Achieving energy efficient data centers using cooling path management coupled with ASHRAE standards Matthew Green; Saket Karajgikar; Philip Vozza; Nick Gmitter; Dan Dyer 2012 28th Annual IEEE Semiconductor Thermal Measurement and Management Symposium (SEMI-THERM) Year: 2012 pp. 288-292 IEEE Conference Publications.*

Substation power transformer risk management: Predictive methodology based on reliability centered maintenance data João Carlos Carneiro 4th International Conference on Power Engineering, Energy and Electrical Drives Year: 2013 pp. 1431-1436 IEEE Conference Publications.*

* cited by examiner

FIG. 4

Tabs: Configuration | Predictive Analysis | Network | Email Notification | Mount Point | SNAP Default — Power Predictive Analysis Settings —

| | | |
|---|---|---|
| Enabled 1st Predictive: | Yes | > |
| History of 1st Predictive: | 30 | Days |
| Future for 1st Predictive: | 30 | Days |
| Enabled 2nd Predictive | No | > |

— Temperature Predictive Analysis Settings —

| | | |
|---|---|---|
| Enabled 1st Predictive: | Yes | > |
| History of 1st Predictive: | 1 | Hours |
| Future for 1st Predictive: | 1 | Hours |
| Enabled 2nd Predictive: | Yes | > |
| History of 2nd Predictive: | 2 | Hours |
| Future for 2nd Predictive: | 2 | Hours |

SYSTEMS AND METHODS FOR PREDICTIVE ANALYSIS

CROSS-REFERENCE TO RELATED APPLICATION(S)

This application claims the benefit of U.S. Provisional Patent Application No. 61/841,112 entitled "SYSTEMS AND METHODS FOR PREDICTIVE ANALYSIS", which was filed on Jun. 28, 2013, the contents of which are all incorporated by reference herein.

TECHNICAL FIELD

Various embodiments of the present invention generally relate to data centers. More specifically, some embodiments of the present invention relate systems and methods for predictive analysis of data types within data centers.

BACKGROUND

Data centers have long had issues with collecting and storing data. Initially there was not enough data, but as software monitoring systems have evolved, such as Data Center Infrastructure Management or DCIM systems, there is now too much information. Many data center facilities are still much more involved with the collection of data than using the data to make informed decisions. More advanced data centers now have the ability to collect data and are working to use this data to lower costs and increase their efficiency as the data center has now become more of a strategic asset than a cost center.

In order to get the most detailed level of power consumption information in the data center, one must get metrics from the point of use. Cabinet power distribution units (referred to as cabinet PDUs or CDUs) with outlet-level measurements allow for an organization to meet this goal. With information about the actual usage of devices, the data center/IT management can make better decisions, not just about which equipment to use, but also when to use particular applications. In the long run, analysis of this information helps with gaining fully optimized utilization of power and IT infrastructure.

The accuracy and granularity of the metrics available from the chosen CDUs is extremely important. While previous generations of CDUs had little or no power monitoring capability, the requirement to obtain highly granular and accurate measurements is paramount to ongoing optimizations. Whereas many early-generation intelligent CDUs may have included amperage as the only metric, the most advanced power handling devices today include the entire scope of energy awareness: Amperage, Voltage, Wattage, Power Factor, Energy (kWh), etc. These are all critically important in understanding where, when, and how efficiently power is being utilized, and in making decisions regarding changes, improvements, and growth according to the needs of the business the data center supports.

Intelligent PDUs or CDUs coupled with a powerful energy management system will likely be a requirement for organizations that are planning any form of DCIM effort over the coming years. DCIM itself is a rapidly growing market segment that relies on the intelligence from the power layer to create much of its value. For some organizations, the full DCIM solution is a day-one requirement, but for others, the initial outlay of cost and time causes a scale-back to a more manageable energy management system solution. For those who choose to start slowly, it is important to choose an energy management system that can be easily integrated into a full DCIM solution.

SUMMARY

Predictive analysis systems and methods are provided. One embodiment of a predictive analysis method is for use in a data center environment that comprises a power manager in communication with at least one cabinet power distribution unit (CDU) that is in power-supplying communication with at least one electronic appliance in an electronic equipment rack. The method comprises (through the power manager) selecting for analysis at least one data type that is monitored by the cabinet power distribution unit, providing a user-defined threshold for the selected data type, collecting from the cabinet power distribution unit historical data associated with the data type, estimating the rate of change for the data type based at least in part on said historical data, predicting when the data type will reach an associated user-defined threshold based on said rate of change, and displaying via a graphical user interface associated with said power manager a progression line for the data type to allow a user to observe a data trend over time, wherein the progression line depicts when the data type is predicted to reach the user-defined threshold.

A predictive analysis system is also provided. One embodiment of the system is for use in a data center environment and broadly comprises at least one cabinet power distribution unit (CDU) in power-supplying communication with at least one electronic appliance in an electronic equipment rack. A power manager is in communication with the CDU and has a graphical user interface. The power manager is configured to select for analysis at least one data type that is monitored by the cabinet power distribution unit, provide a user-defined threshold for the data type, collect from the cabinet power distribution unit historical data associated with the data type, estimate the rate of change over for the data type based at least in part on the historical data, predict when the data type will reach an associated user-defined threshold based on the rate of change, and display (via the graphical user interface associated with said power manager) a progression line for the data type to allow a user to observe a data trend over time, wherein the progression line depicts when the data type is predicted to reach the user-defined threshold.

BRIEF DESCRIPTION OF THE DRAWINGS

FIG. 4 is a screen shot of a representative system setup page from an application running on the power manager of FIG. 3;

FIG. 5 is a screen shot of a configuration page for a trend predictive analysis report.

DETAILED DESCRIPTION

Figure 1:
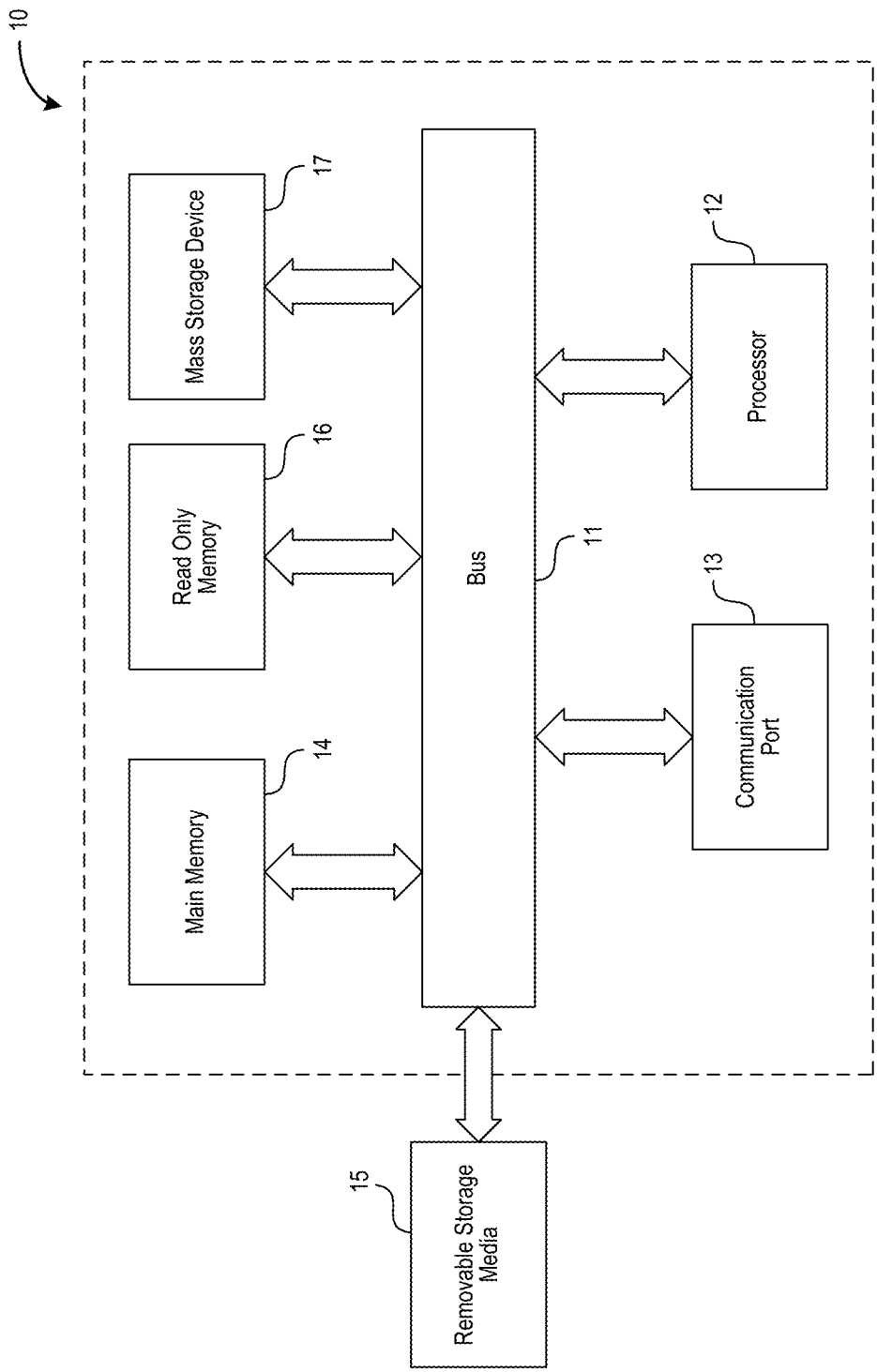
FIG. 1 is an example of a computer system 10 with which embodiments of the present invention may be utilized.

Various embodiments of the present invention generally relate to data centers. More specifically, some embodiments of the present invention relate systems and methods for generating a predictive analysis of data types within data centers. Various embodiments include a power manager that measures, monitors, and trends data types (e.g., power, temperature, resource utilization, etc.) within an enterprise-wide network of components (e.g., a cabinet power distribution unit) in a data center. In some embodiments, the power manager application uses historical data associated with selected data types from selected components within the data center to generate information and alerts regarding predictions of future data center activity.

For example, a user can interact with a graphical user interface screen to select desired components and data types for monitoring and analysis. By requesting a predictive analysis, the system can use the historical data to estimate the rate of growth of the data types, e.g., power and temperature readings, and to estimate the date/time at which the readings are expected to exceed a user-defined threshold. A progression line can be graphed on top of the historical data within a graphical user interface to allow the user to visually see trends. The predictive analysis can be repeated or updated (e.g., periodically, on user-defined schedule, etc.) on all desired components or objects, and alarms can be issued if the system predicts that a threshold will be exceeded in the near future.

In the following description, for the purposes of explanation, numerous specific details are set forth in order to provide a thorough understanding of embodiments of the present invention. It will be apparent, however, to one skilled in the art that embodiments of the present invention may be practiced without some of these specific details.

Moreover, the techniques introduced here can be embodied as special-purpose hardware (e.g., circuitry), as programmable circuitry appropriately programmed with software and/or firmware, or as a combination of special-purpose and programmable circuitry. Hence, embodiments may include a machine-readable medium having stored thereon instructions that may be used to program a computer (or other electronic devices) to perform a process. The machine-readable medium may include, but is not limited to, floppy diskettes, optical discs, compact disc read-only memories (CD-ROMs), magneto-optical discs, ROMs, random access memories (RAMs), erasable programmable read-only memories (EPROMs), electrically erasable programmable read-only memories (EEPROMs), application-specific integrated circuits (ASICs), magnetic or optical cards, flash memory, or other type of media/machine-readable medium suitable for storing electronic instructions.

Terminology

Brief definitions of terms, abbreviations, and phrases used throughout this application are given below.

The terms "in communication with", "connected" or "coupled" and related terms are used in an operational sense and are not necessarily limited to a direct physical connection or coupling. Thus, for example, two devices may be coupled directly, or via one or more intermediary media or devices. As another example, devices may be coupled in such a way that information can be passed therebetween, while not sharing any physical connection with one another. Based on the disclosure provided herein, one of ordinary skill in the art will appreciate a variety of ways in which connection or coupling exists in accordance with the aforementioned definition.

The phrases "in some embodiments," "according to some embodiments," "in the embodiments shown," "in other embodiments," and the like generally mean the particular feature, structure, or characteristic following the phrase is included in at least one implementation of the present invention, and may be included in more than one implementation. In addition, such phrases do not necessarily refer to the same embodiments or different embodiments.

If the specification states a component or feature "may", "can", "could", or "might" be included or have a characteristic, that particular component or feature is not required to be included or have the characteristic.

The term "module" refers broadly to a software, hardware, or firmware (or any combination thereof) component. Modules are typically functional components that can generate useful data or other output using specified input(s). A module may or may not be self-contained. An application program (also called an "application") may include one or more modules, or a module can include one or more application programs.

Exemplary Computer System Overview

Embodiments of the present invention include various steps and operations, which are described herein. A variety of these steps and operations may be performed by hardware components or may be embodied in machine-executable instructions, which may be used to cause a general-purpose or special-purpose processor programmed with the instructions to perform the steps. Alternatively, the steps may be performed by a combination of hardware, software, and/or firmware. As such, FIG. 1 is an example of a computer system 10 with which embodiments of the present invention may be utilized. According to the present example, the computer system includes a bus 11, at least one processor 12, at least one communication port 13, a main memory 14, a removable storage media 15, a read only memory 16, and a mass storage 17.

Processor(s) 12 can be any known processor, such as, but not limited to, Intel® lines of processors; AMD® lines of processors; or Motorola® lines of processors. Communication port(s) 130 can be any of an RS-232 port for use with a modem-based dialup connection, a 10/100 Ethernet port, or a Gigabit port using copper or fiber. Communication port(s) 13 may be chosen depending on a network such as a Local Area Network (LAN), Wide Area Network (WAN), or any network to which the computer system 100 connects.

Main memory 14 can be Random Access Memory (RAM) or any other dynamic storage device(s) commonly known in the art. Read only memory 16 can be any static storage device(s) such as Programmable Read Only Memory (PROM) chips for storing static information such as instructions for processor 12.

Mass storage 17 can be used to store information and instructions. For example, hard disks such as the Adaptec® family of SCSI drives, an optical disc, an array of disks such as RAID, such as the Adaptec family of RAID drives, or any other mass storage devices may be used.

Bus 11 communicatively couples processor(s) 12 with the other memory, storage and communication blocks. Bus 110 can be a PCI/PCI-X or SCSI based system bus depending on the storage devices used.

Removable storage media 15 can be any kind of external hard-drives, floppy drives, IOMEGA® Zip Drives, Compact Disc-Read Only Memory (CD-ROM), Compact Disc-Re-Writable (CD-RW), and/or Digital Video Disk-Read Only Memory (DVD-ROM).

The components described above are meant to exemplify some types of possibilities. In no way should the aforementioned examples limit the scope of the invention, as they are only exemplary embodiments.

Embodiments of the present invention may be implemented using a combination of one or more modules. For example, embodiments provide for a graphical user interface generation module to generation one or more graphical user interface screens to convey results/information and take instructions, a general-purpose or special-purpose "communications module" for interfacing with a smart components within the data center, a "prediction module" to generate a predictive trends of historical data types, a "data gathering module" to collect information from smart components and sensors within the data centers, a "database" to store data center layouts and/or historical information of associated data types, a "alarm generation module" to determine if an alarm should be generated and generate one or more alarms, as well as other modules for providing various functionality needed by embodiments of the present invention. Still yet, various embodiments may incorporate two or more of these modules into a single module and/or associate a portion of the functionality of one or more of these modules with a different module.

Illustrative embodiments of systems and methods for datacenter monitoring and management will now be described. This illustration is not intended to be exhaustive, but rather to highlight some of the benefits and advantages associated with embodiments and features.

Figure 2:
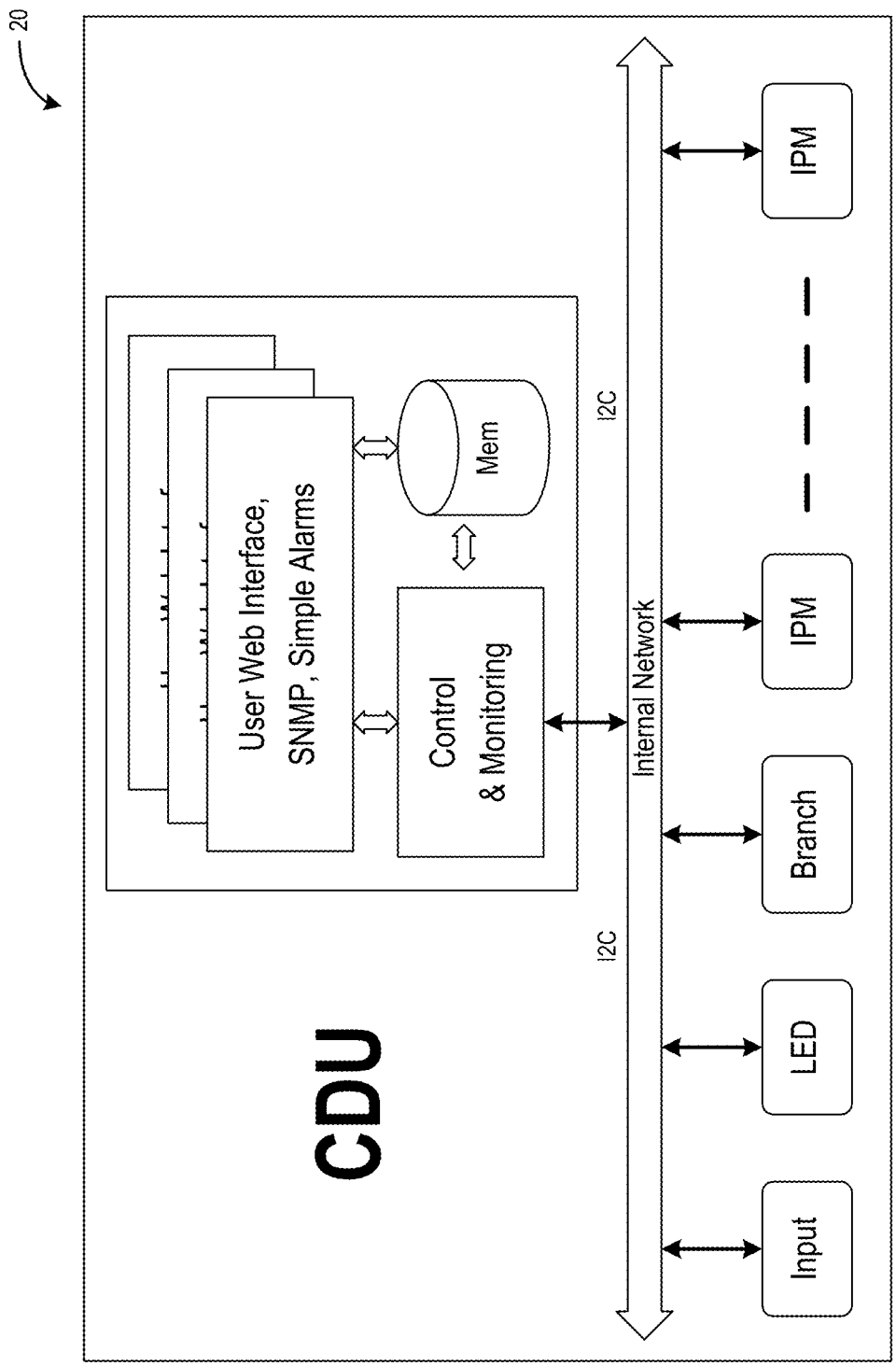
FIG. 2 is a diagram of a cabinet power distribution unit (CDU) for use with one or more embodiments of the present invention.

FIG. 2 is a diagrammatic view of an exemplary architecture for a cabinet power distribution unit (CDU) 20, also sometimes referred to as a power distribution unit (PDU), which would be installed in an electronic equipment rack within a data center to provide operating power to various electronic equipment. Representative CDUs are described in U.S. Pat. No. 7,099,934, U.S. Pat. No. 7,043,543, U.S. Pat. No. 7,777,365, U.S. Pat. No. 7,706,134 and U.S. Pat. No. 8,305,737, each of which is incorporated herein be reference in its entirety. Polling all of the data and status conditions from the multitude of such CDUs in one or more data centers can be quite a task. There are many SNMP-based tools on the market to provide this capability, but it is believed that none provide the full feature set and ease of use and implementation that Server Technology's Sentry Power Manager (SPM) solution can provide.

Figure 3:
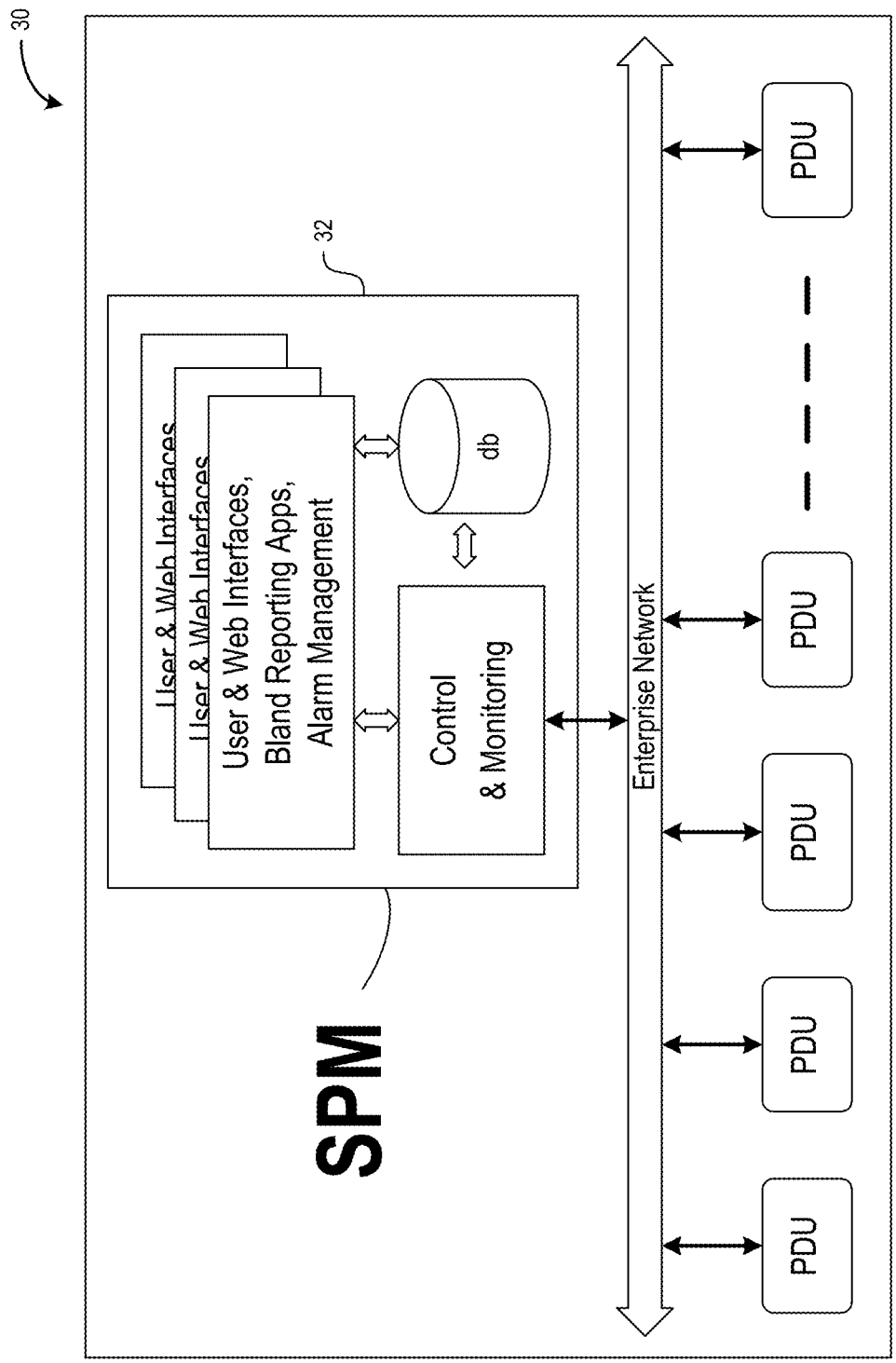
FIG. 3 is a diagrammatic view of a representative power manager system for use with one or more embodiments of the present invention, and referred to at times as the Sentry Power Manager (SPM) energy management system.

FIG. 3 is a diagrammatic view of an exemplary architecture for a representative SPM energy management system 30 for use with the present invention. System 30 includes a power manager 32, identified in the FIG. 3 as SPM (Sentry Power Manager). System 30 provides the same high level of access and security as the CDU 20 and meets the additional data center challenges described above. The SPM energy management system 30 really is an extension of the reliable architecture built into the CDU. Using both SNMP and Server Technology's proprietary SNAP™ communication protocol, SPM can provide mass configuration, full CDU monitoring, power management and analysis, and alarm monitoring and management to meet the challenges of today's data center. SPM has a trend feature/capability that collects data from CDUs, such as CDU 10 in FIG. 1. It displays trend graphs with historical data for CDUs and for rolled up objects such as zones. SPM maintains user-defined high and low thresholds for each object, and creates alarms when the thresholds are reached.

Predictive analysis is designed to help users evaluate when the power consumption or temperature, for example, might reach a critical or warning threshold, and warn a user in advance. The power needs and cooling needs of a data center increase over time, and it is helpful for data center managers to analyze the past in order to predict when expansion will be necessary. Viewing the historical data to make decisions for power planning can be difficult, since the data is typically very sporadic. The predictive analysis regression line is a clear measure of the growth rate in power consumption.

Assuming that the power continues to increase at approximately the same rate as in the past, predictive analysis is able to predict the date at which the power needs will exceed the capacity threshold. The user is notified by alarms and (optionally) emails when that date approaches. The predictive analysis can be applied at multiple levels to see more focused or more general results: facility, UPS, floor, section, row, cabinet, etc.

Predictive analysis is used to estimate the rate of growth collected date readings, such as power and temperature readings, and to estimate the date at which the readings will exceed a threshold. The progression line is graphed along with the historical data. The analysis may be performed periodically on all objects, and alarms are issued if it is predicted that a threshold will be exceeded in the near future.

There are various data types that can support predictive analysis, including:
Cabinet Total Power
CDU Power Density
CDU Total Power
Circuit Total Current
Circuit Total Power
Infeed Line Current
Infeed Line Active Power
Infeed Line Voltage
Infeed Line Apparent Power
Infeed Line Crest Factor
Infeed Line Power Factor
Infeed Line Capacity Used
Infeed Phase Current
Infeed Phase Voltage
Line Total Current
Line Total Power
Location Total Power
Outlet Current
Outlet Active Power
Outlet Voltage
Outlet Apparent Power
Outlet Crest Factor
Outlet Power Factor
Outlet Group Total Current
Outlet Group Total Power
Outlet Cluster Total Current
Outlet Cluster Total Power
Branch current
Line current per CDU
Phase active power
Phase current
Phase voltage
Phase apparent power
Phase power factor
Phase current crest factor
Phase energy
Input cord active power
Input cord apparent power
Input cord power factor
Input cord out of balance percentage
Input cord energy
Sensor Humidity
Zone Total Power
Cabinet Device Total Current
Cabinet Device Total Power
Location Power Usage Effectiveness (PUE)

Zone Power Usage Effectiveness (PUE)

Outlet energy

Of the above data types, the following are currently being employed to support predictive analysis:

Cabinet Total Power

CDU Total Power

Circuit Total Power

Line Total Power

Location Total Power

Zone Total Power

Sensor Temperature

The following example is representative of how to use predictive analysis to analyze trends for power and temperature. To configure the system-wide predictive analysis time span settings for power and for temperature, there can be up to two sets of prediction time spans for power and up to two for temperature. This is illustrated in the predictive analysis system setup page 40 depicted in FIG. 4, which is screen shot of what a user might see on the Sentry Power Manager application which is in communication with one or more CDUs 20 in a data center environment. The predictive analysis tab allows the user to focus on device growth and customize the growth rate "history" and "future" for a single set of growth data ($1^{st}$ predictive) or for two sets of growth data ($2^{nd}$ predictive). Both the specified history (how far back) and the specified future (how far forward) are used in calculating growth rates for device operations, and then predicting when the power and temperature thresholds for those devices could be crossed.

In the example shown, one set of parameters is available for power predictive analysis for CDUs, measured in Watts, and an identical set of parameters is available for predictive analysis for sensors measuring temperature. Both power and temperature allow two sets of history and future to be configured: $1^{st}$ predictive and $2^{nd}$ predictive. Using both predictives (set by default) allows a user to see how much increase in growth occurred the last day when compared to the previous year.

To configure the growth rates and associated dates that will display on the Predictive Analysis Tab for the selected objects in FIG. 4, drop down menus are provided (as shown) to select the growth rate history and future parameters. The parameters on the left affect power predictive analysis for CDUs, and the parameters on the right affect temperature predictive analysis for sensors. Again, it should be appreciated that the power and temperature data types in this example are representative only. With respect to each of these two data types (power and temperature) a user can enable the $1^{st}$ predictive set of growth data by selecting the associated "Yes" and then set the history and future parameters as desired, or simply accept the default values. Optionally, for each of the power and temperature data types, the user can also set the $2^{nd}$ predictive set of growth data by selecting "Yes" and setting parameters as desired, or simply accepting the default values. Notably, the $2^{nd}$ predictive for each data type cannot be enabled unless the $1^{st}$ predictive for that data type is also enabled.

It can be seen in FIG. 4 that the time span is for "History" is the amount of time (days/hours) in the past to consider for the prediction, and the time span for "Future" is the amount of time (days/hours) in the future to consider for the prediction. Designating a "Future" time span, such as 10 or 20 days, is optional. If none is selected, then the system will still estimate the rate of change based, at least in part, on the historical data and generate a predictive trend line. Capabilities can also be provided to allow a user to configure the high and low power/temperature thresholds for an object that supports predictive analysis.

Figure 5:
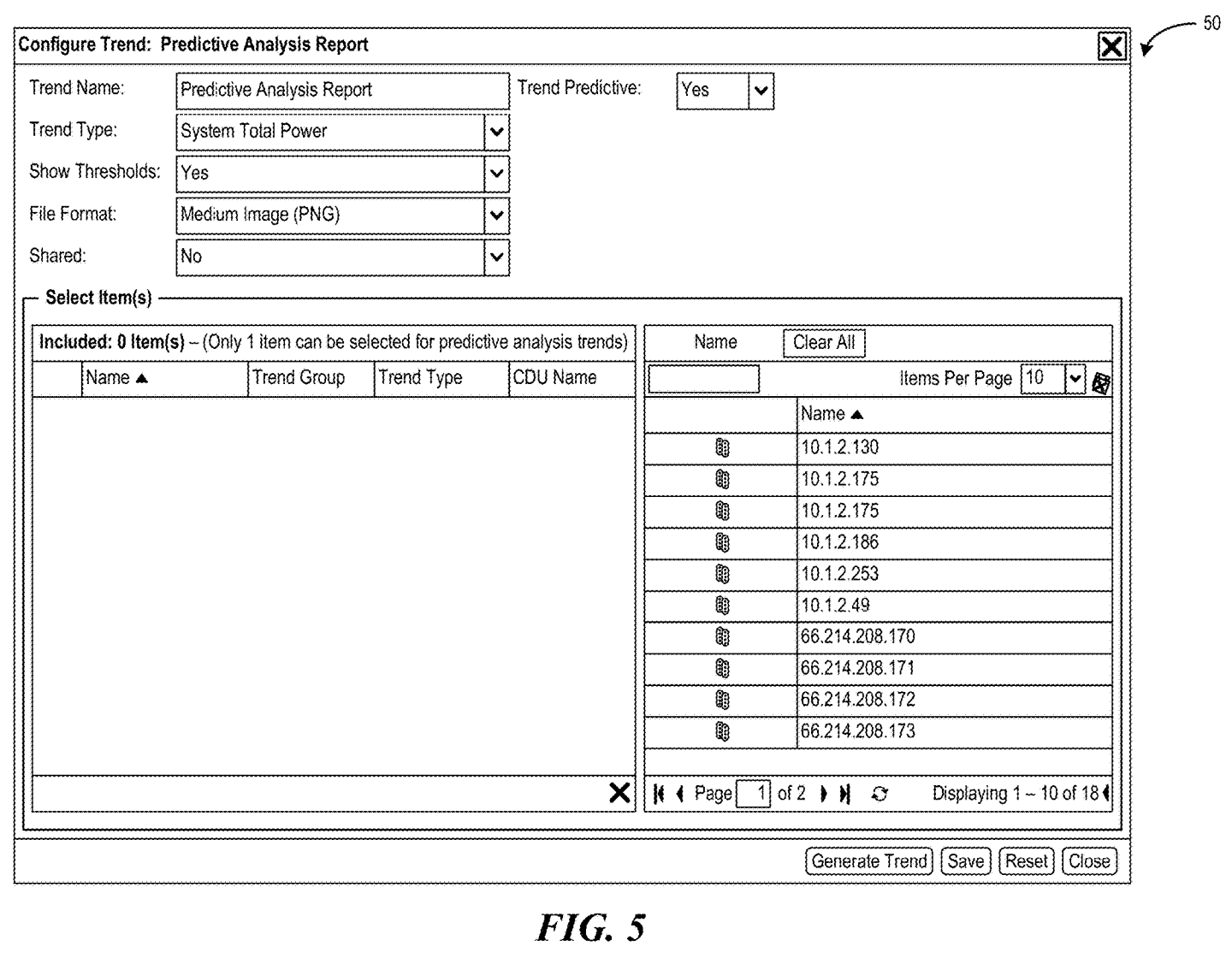
Figure 6:
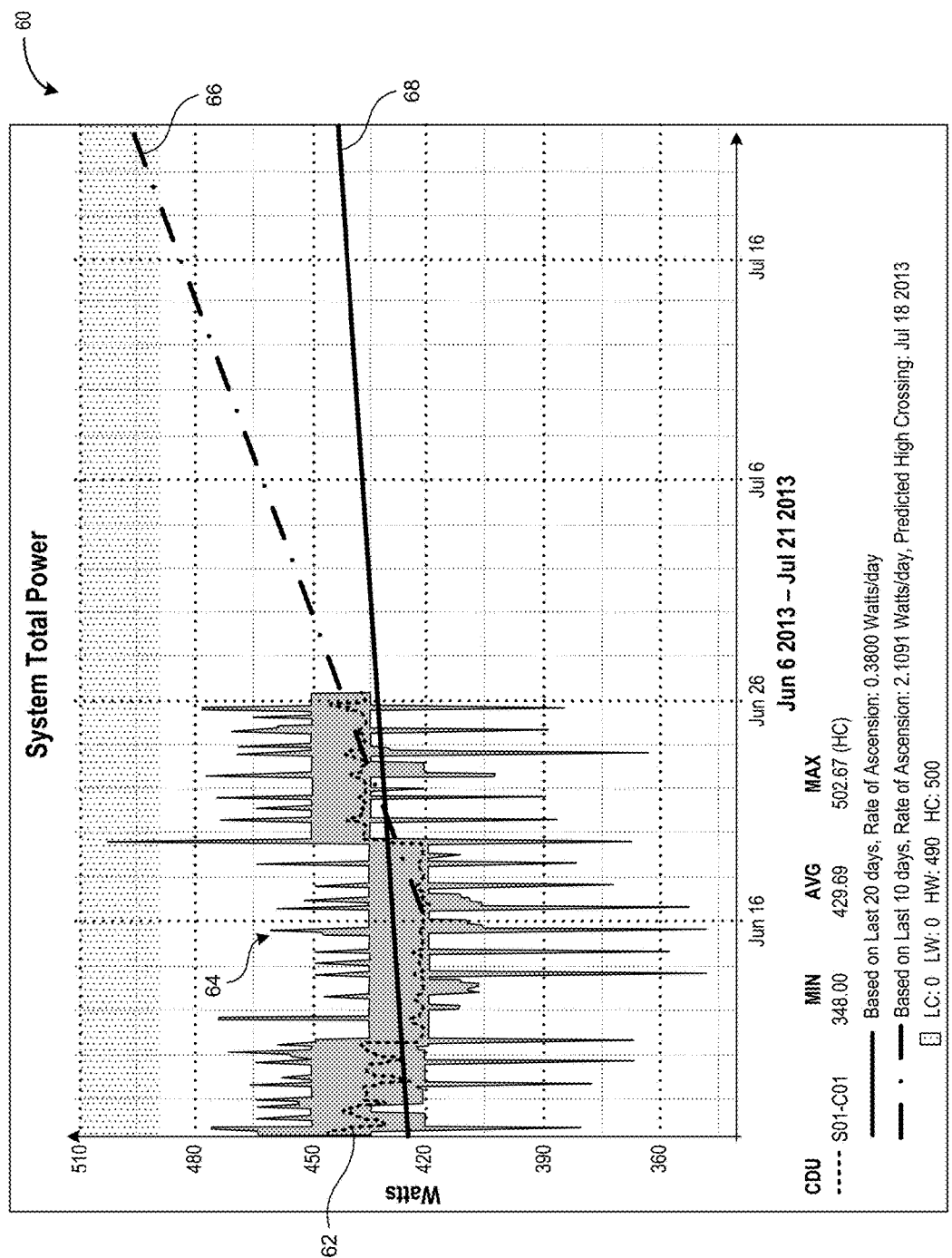
FIGS. 6-9 illustrate representative predictive analysis reports that could be generated for different data types according to the present invention.

FIG. 5 is a screen shot of a configuration page 50 for a trend predictive analysis report. From this page, a device or CDU of interest can be identified, e.g., by its IP address, for trend and certain parameters for the analysis report can be selected as shown. In the example shown, a report is to be generated for system total power associated with the CDU of interest. This report 60 is depicted as a graph in FIG. 6. Line 62 represents the historical average during the trended period of time of the data itself (i.e., the average trend line), and shaded data region 64 the minimums and maximums for the period of time that the readings represent. For example, if the readings are taken every 15 minutes or once per day, then shaded region 64 (referred to herein as the "min/max plot" or "min/max line") represents the minimums and maximums during each such reading interval. In the legend at the bottom portion of the report, the minimum, maximum and average values for the historical data (over the selected period of time) are provided. Prediction lines 66 and 68 are provided based on the historical data collected over the previous 10 days and 20 days, respectively. The bottom of the legend shows the four threshold values have been set: low critical, low warning, high warning, and high critical. Shaded areas in the upper portion of the graph mark the regions beyond the high threshold(s) which the user has configured. The legend shows two values for each prediction line 66 and 68:

1. Rate of Ascension: The linear rate at which the data progresses on the trend report, or by how much the wattage/temperature is rising per day on average. This rate is calculated based on the "history" setting defined in the predictive analysis setup page discussed previously.

2. Predicted Crossing: A date that estimates when the trended data will reach the warning/critical threshold defined for the object—if the values continue to grow at approximately the same rate. The date will only be displayed if within the "future" value is defined in the predictive analysis settings page.

The predicted rate and crossing date are saved for each object in the system periodically. It can be viewed in a list format. Each object will generate a system alarm when the predicted crossing date is in the near future (within the specified time span). There is an option to have alarms sent by email.

Figure 7:
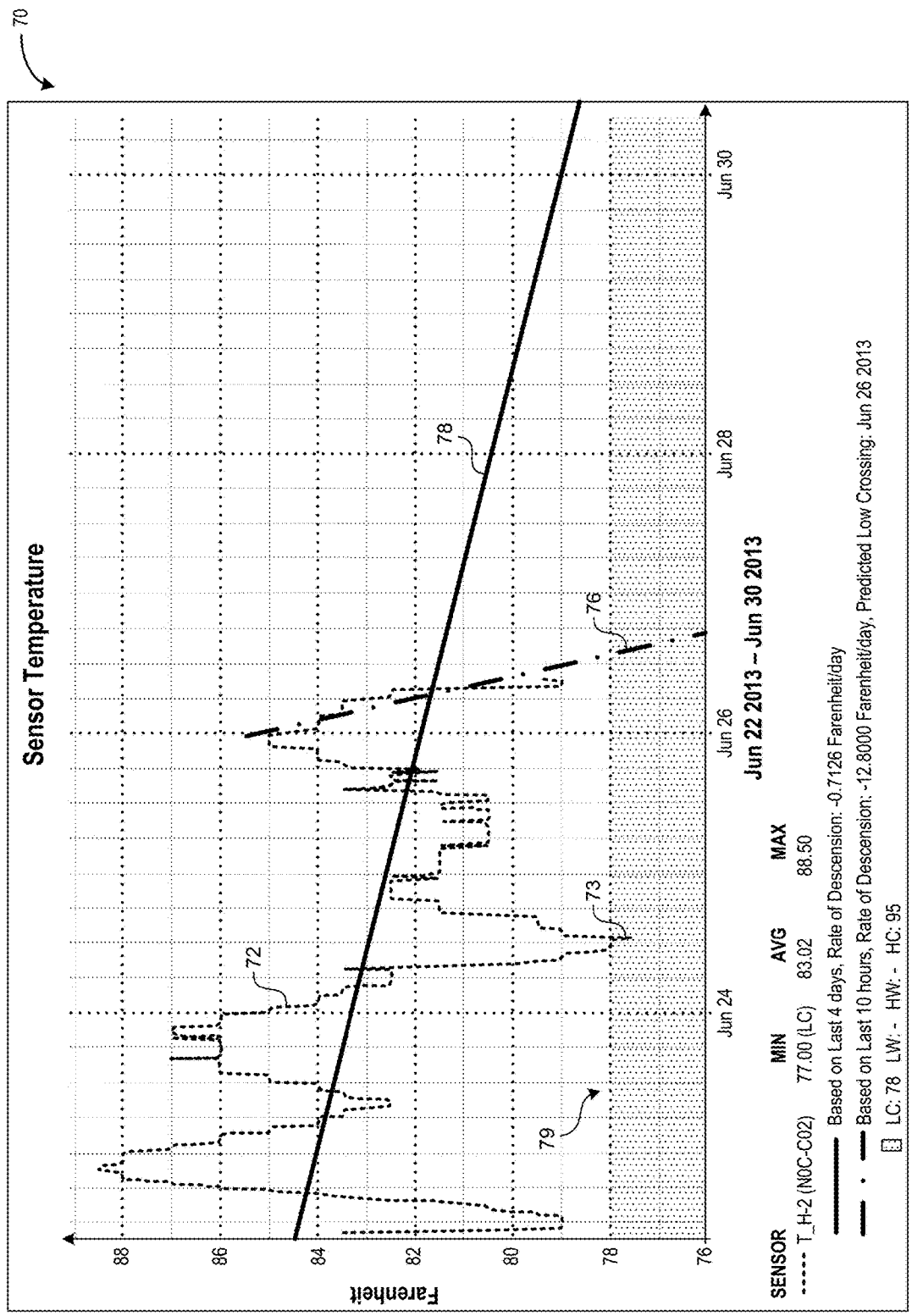

FIG. 7 shows a similar report 70 for sensor temperature having average trend line 72, min/max plot 74, and predictive trend lines 76, 78. A lower critical threshold region (below 78 degrees F.) 79 is also shown. The report 70 shows that, based on the rate of descent over the last 10 hours, it is predicted that this low temperature crossing will occur on Jun. 26, 2013.

Figure 8:
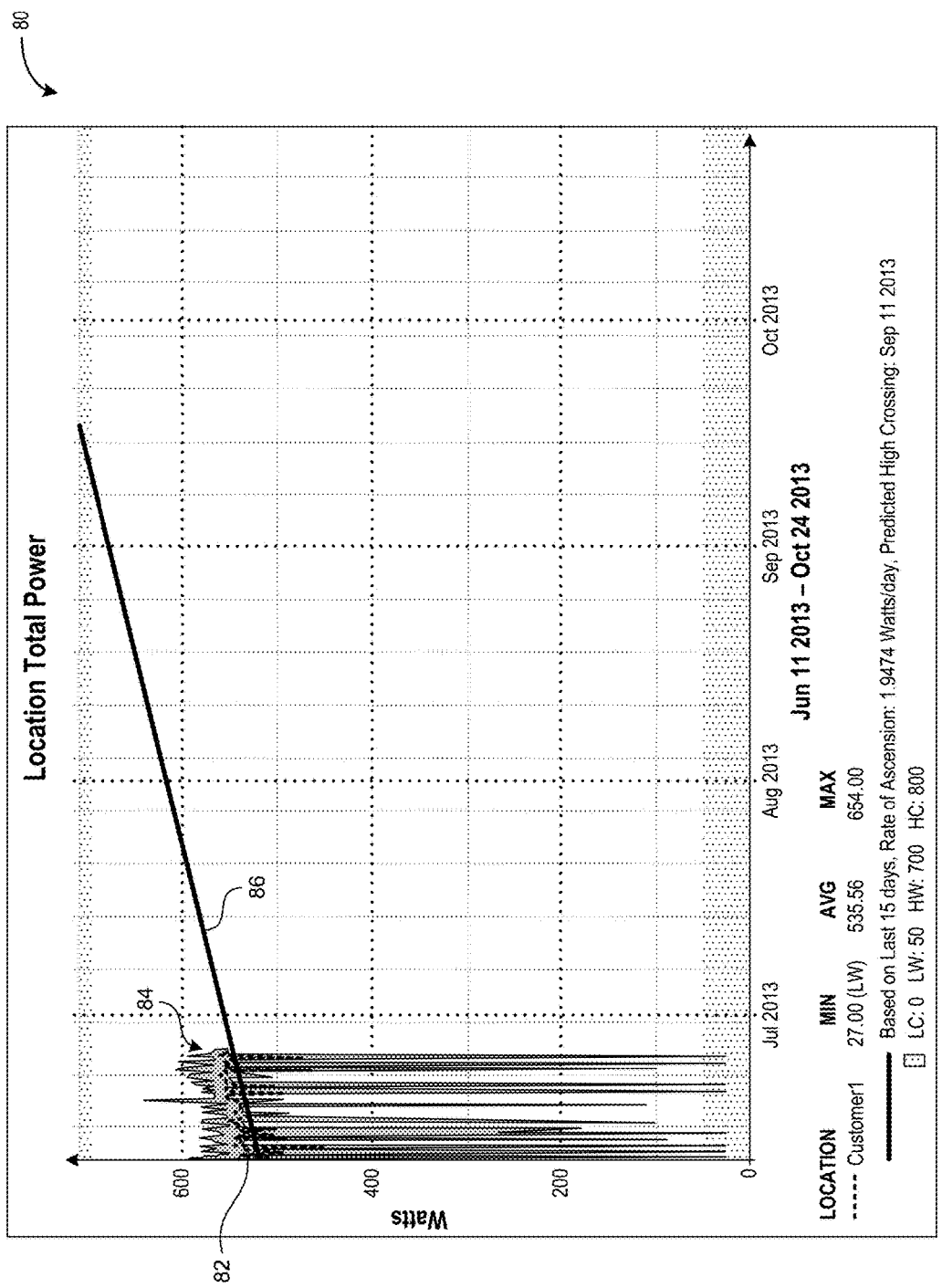

FIG. 8 shows a report 80 for location total power. Here, the location could be a data center, or a zone within a data center environment, for example. In this example, the report is the total power for a given customer location. The average trend line is shown at 82 and its associated min/max plot at 84. Here, only one predictive trend line 86 is shown. The report predicts that the high threshold crossing will occur on Sep. 11, 2013.

Figure 9:
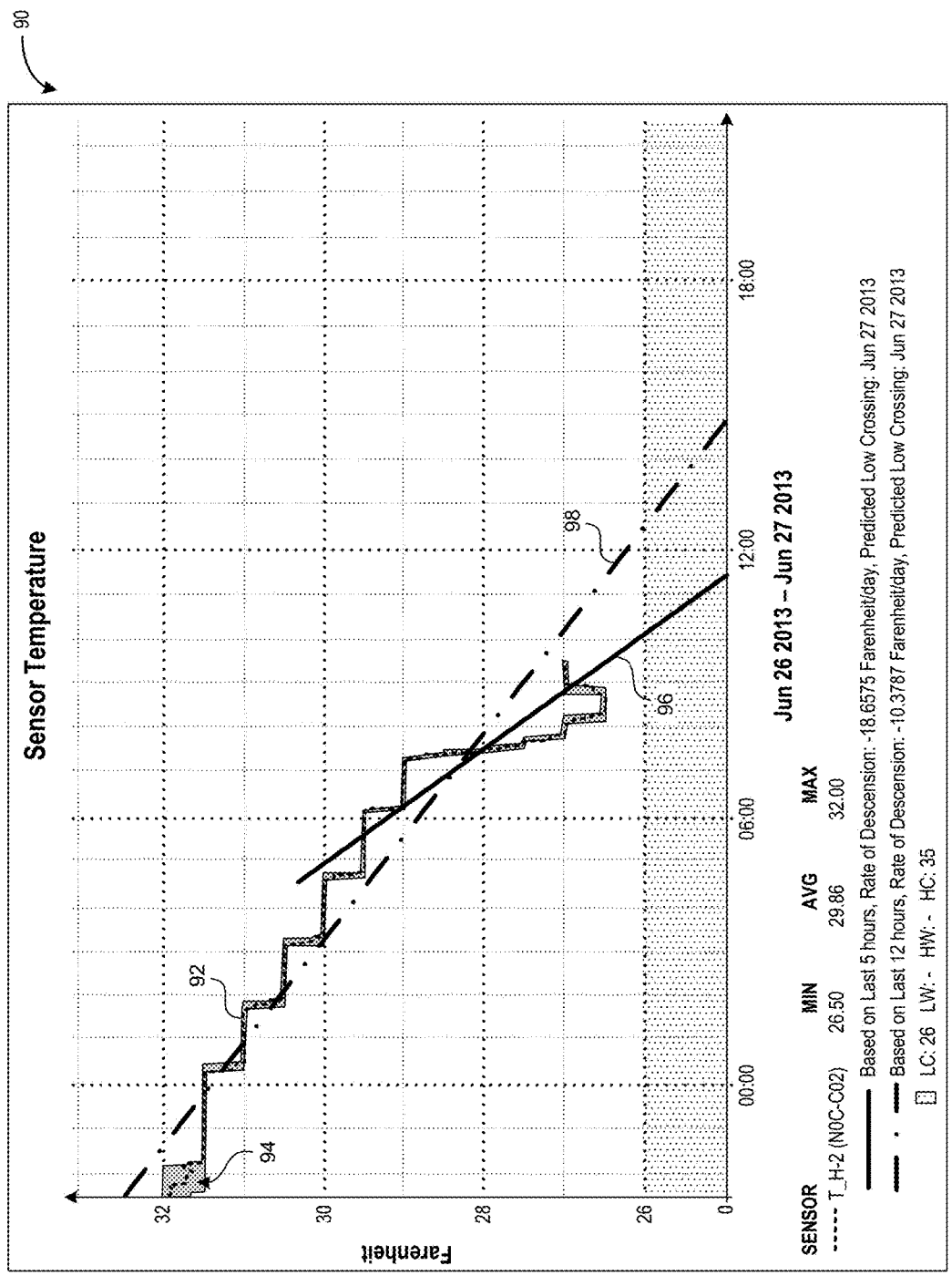

Lastly, FIG. 9 depicts a report 90 again showing sensor temperature having associated average trend line 92, min/max line 94, and predictive trend lines 96, 98. In this example, based on collected data over the previous five and twelve hours, both trend lines 96, 98 predict the low critical temperature crossing (26 degree F.) will occur on Jun. 27, 2013.

A representative algorithm used in predictive analysis for power and temperature uses the following inputs:
  Power/temperature trending data for an object.
  Four threshold values: low critical, low warning, high warning, and high critical.
  Amount of time in the past to analyze.
  Amount of time in the future to consider for alarms.
The algorithm generates the following outputs:
  Trend image with the predictive trend line (or 2 of them) graphed on top of the historical data.
  The rate of growth.
  The date at which the threshold will be reached, if the rate of growth remains the same.
  Alarm.

To calculate the predictive trend line y=ax+b, where x represents the time and y represents the set of power/temperature values, the following linear fit is used:

$$a = \frac{(\Sigma y)(\Sigma x^2) - (\Sigma x)(\Sigma xy)}{n(\Sigma x^2) - (\Sigma x)^2}$$

$$b = \frac{n(\Sigma xy) - (\Sigma x)(\Sigma y)}{n(\Sigma x^2) - (\Sigma x)^2}$$

The analyzed data and the predictive trend line (or progression line) can then be drawn based on the historical trend, and a calculation made for the date at which the progression line is predicted to cross each threshold. An alarm can then be generated as needed.

It is contemplated that future implementations could issue alarms based on the rate of ascension, using a new threshold for rate. This could prove especially useful for temperature prediction to detect when the temperature is rising too fast. It is also contemplated that non-linear regression lines, such as exponentials and polynomials, could be used in addition to (or separate from) linear regression lines. Furthermore, it is contemplated that time-sensitive regression lines could be employed, which would mean that more recent data would have more weight.

Various modifications and additions can be made to the embodiments discussed without departing from the scope of the present invention. For example, while the embodiments described above refer to particular features, the scope of this invention also includes embodiments having different combinations of features and embodiments that do not include all of the described features. Accordingly, the scope of the present invention is intended to embrace all such alternatives, modifications, and variations and all equivalents thereof.

From the foregoing, it will be appreciated that specific embodiments of the invention have been described herein for purposes of illustration, but that various modifications may be made without deviating from the scope of the invention. Accordingly, the invention is not limited except as by the appended claims.

We claim:

1. A predictive analysis method applicable to a data center housing one or more power distribution units (PDUs), comprising:
  (a) collecting historical data of at least one data type, wherein the historical data includes past values of the at least one data type;
  (b) selecting, for analysis from the historical data, recent past values of the at least one data type;
  (c) estimating the rate of change for said at least one data type based, at least in part, on said historical data, wherein said rate of change indicates an amount by which wattage changes per unit interval of time;
  (d) predicting when said at least one data type will reach an associated user-defined threshold based on said rate of change;
  (e) displaying, via a graphical user interface, a predictive trend indicator for said at least one data type, said predictive trend indicator depicting when during the future said data type is predicted to reach said user-defined threshold; and
  (f) determining changes in a number of the one or more PDUs that can be supported by the data center based on the past values of the at least one data type, the recent past values of the at least one data type, and the predictive trend indicator for the at least one data type.

2. A predictive analysis method according to claim 1 further comprising selecting a plurality of different data types for analysis and performing operations (b) through (e) for each of said different data types.

3. A predictive analysis method according to claim 1 further comprising displaying, via the graphical user interface, a historical data indicator for said at least one data type.

4. A predictive analysis method according to claim 1 further comprising periodically repeating operations (b) through (e) for said at least one data type according to a user-defined schedule.

5. A predictive analysis method according to claim 1 further comprising notifying a user prior to a date when said data type is predicted to reach said user-defined threshold.

6. A predictive analysis method according to claim 5 whereby said user is notified via email.

7. A predictive analysis method according to claim 1 wherein said user-defined threshold is a low critical threshold, a low warning threshold, a high warning threshold or a high critical threshold.

8. A predictive analysis method for use in a data center that comprises a power manager in communication with at least one power distribution unit (PDU) that is in power-supplying communication with at least one electronic appliance in an electronic equipment rack, said predictive analysis method comprising:
  through said power manager:
    (a) collecting, from the at least one PDU, historical data of at least one data type, wherein the historical data includes past values of the at least one data type;
    (b) providing a user-defined threshold for said at least one data type;
    (c) selecting, for analysis from the historical data, recent past values of the at least one data type;
    (d) estimating the rate of change for said at least one data type based, at least in part, on said historical data, wherein said rate of change indicates an amount by which said at least one data type changes per unit interval of time;
    (e) predicting when said at least one data type will reach an associated user-defined threshold based on said rate of change;
    (f) displaying, via a graphical user interface associated with said power manager, a predictive trend indicator for said at least one data type to allow a user to observe a data trend over time, said predictive trend indicator depicting when during the future said data type is predicted to reach said user-defined threshold; and
    (g) determining changes in a number of the one or more PDUs that can be supported by the data center based on the recent values of the at least one data type, the recent past values of the at least one data type, and the predictive trend indicator for the at least one data type.

9. A predictive analysis method according to claim 8 further comprising selecting a plurality of different data types for analysis and performing operations (b) through (f) for each of said different data types.

10. A predictive analysis method according to claim 8 further comprising displaying, via the graphical user interface, a historical data indicator for said at least one data type.

11. A predictive analysis method according to claim 8 further comprising periodically repeating operations (b) through (e) for said at least one data type according to a user-defined schedule.

12. A predictive analysis method according to claim 8 wherein said at least one data type is selected from a group consisting of: cabinet total power, PDU power density, PDU total power, PDU total current, circuit total current, circuit total power, infeed line current, infeed line active power, infeed line voltage, infeed line apparent power, infeed line crest factor, infeed line power factor, infeed line capacity used, infeed phase current, infeed phase voltage, line total current, line total power, location total power, outlet current, outlet active power, outlet voltage, outlet apparent power, outlet crest factor, outlet power factor, outlet group total current, outlet group total power, outlet cluster total current, outlet cluster total power, per input power sensor capacity used, per input power sensor active power, per input power sensor apparent power, per input power sensor power factor, sensor temperature, sensor humidity, and zone total power.

13. A predictive analysis method according to claim 8 wherein said power manager performs operations (a) through (f) with respect to a plurality of PDUs within the data center.

14. A predictive analysis method according to claim 13 wherein said power manager performs operations (b) through (f) with respect to a plurality of data types for each of said plurality of PDUs.

15. A predictive analysis method according to claim 8 further comprising displaying, via the graphical user interface, a historical data indicator for said at least one data type.

16. A predictive analysis method according to claim 8 further comprising periodically repeating operations (b) through (e) for said at least one data type according to a user-defined schedule.

17. A predictive analysis method according to claim 8 further comprising notifying a user prior to a date when said data type is predicted to reach said user-defined threshold.

18. A predictive analysis method according to claim 17 whereby said user is notified via email.

19. A predictive analysis method according to claim 8 wherein said user-defined threshold is a low critical threshold, a low warning threshold, a high warning threshold or a high critical threshold.

20. A predictive analysis system for use in a data center, comprising:
at least one power distribution unit (PDU) that is in power-supplying communication with at least one electronic appliance in an electronic equipment rack; and
a power manager in communication with said PDU and having a graphical user interface, said power manager configured to:
(a) collect, from said PDU, historical data of at least one data type, wherein the historical data includes past values of the at least one data type;
(b) provide a user-defined threshold for said at least one data type;
(c) select, for analysis from the historical data, recent past values of the at least one data type;
(d) estimate the rate of change for said at least one data type based, at least in part, on said historical data, wherein said rate of change indicates an amount by which wattage changes per unit interval of time;
(e) predict when said at least one data type will reach an associated user-defined threshold based on said rate of change; and
(f) display, via said graphical user interface associated with said power manager, a predictive trend indicator for said at least one data type to allow a user to observe a data trend over time, said predictive trend indicator depicting when during the future said data type is predicted to reach said user-defined threshold; and
(g) determine changes in a number of the one or more PDUs that can be supported by the data center based on the recent values of the at least one data type, the recent past values of the at least one data type, and the predictive trend indicator for the at least one data type.

21. A predictive analysis system according to claim 20 wherein said power manager is further configured to select a plurality of different data types for analysis and to perform operations (b) through (f) for each of said different data types.

22. A predictive analysis system according to claim 20 wherein said power manager is further configured to display, via the graphical user interface, a historical data indicator for said at least one data type.

23. A predictive analysis system according to claim 20 wherein said power manager is further configured to periodically repeat operations (b) through (e) for said at least one data type according to a user-defined schedule.

24. A predictive analysis system according to claim 20 wherein said at least one data type is selected from a group consisting of: cabinet total power, PDU power density, PDU total power, PDU total current, circuit total current, circuit total power, infeed line current, infeed line active power, infeed line voltage, infeed line apparent power, infeed line crest factor, infeed line power factor, infeed line capacity used, infeed phase current, infeed phase voltage, line total current, line total power, location total power, outlet current, outlet active power, outlet voltage, outlet apparent power, outlet crest factor, outlet power factor, outlet group total current, outlet group total power, outlet cluster total current, outlet cluster total power, per input power sensor capacity used, per input power sensor active power, per input power sensor apparent power, per input power sensor power factor, sensor temperature, sensor humidity, and zone total power.

25. A predictive analysis system according to claim 20 further comprising a plurality of PDUs each in power-supplying communication with at least one associated electronic appliance in an associated electronic equipment rack, and wherein said power manager is further configured to perform operations (a) through (f) with respect to a plurality of PDUs within the data center.

26. A predictive analysis system according to claim 25 wherein said power manager is further configured to perform operations (b) through (f) with respect to a plurality of data types for each of said plurality of PDUs.

27. A predictive analysis system according to claim 20 wherein said power manager is further configured to display, via the graphical user interface, a historical data line for said at least one data type.

28. A predictive analysis system according to claim 20 wherein said power manager is further configured to periodically repeat operations (b) through (e) for said at least one data type according to a user-defined schedule.

29. A predictive analysis system according to claim 20 wherein said power manager is further configured to notify a user prior to a date when said data type is predicted to reach said user-defined threshold.

30. A predictive analysis system according to claim 29 wherein said power manager is configured to notify said user via email.

31. A predictive analysis system according to claim 20 wherein said user-defined threshold is a low critical threshold, a low warning threshold, a high warning threshold or a high critical threshold.

32. A predictive analysis system according to claim 20 wherein said power manager is a computer system.

33. A non-transitory computer readable storage medium applicable to a data center housing one or more power distribution units (PDUs), the storage medium having instructions stored thereon that, when executed by a processing system, cause the processing system to:
（a) collect, from at least one PDU, historical data of at least one data type, wherein the historical data includes past values of the at least one data type;
（b) select, for analysis from the historical data, recent past values of the at least one data type;
（c) estimate the rate of change for said at least one data type based, at least in part, on said historical data, wherein said rate of change indicates an amount by which said at least one data type changes per unit interval of time;
（d) predict when said at least one data type will reach an associated user-defined threshold based on said rate of change; and
（e) display, via a graphical user interface, a predictive trend indicator for said at least one data type to allow a user to observe a data trend over time, said predictive trend indicator depicting when during the future said data type is predicted to reach said user-defined threshold; and
（g) determine changes in a number of the one or more PDUs that can be supported by the data center based on the past values of the at least one data type, the recent past values of the at least one data type, and the predictive trend indicator for the at least one data type.

34. A predictive analysis method according to claim 1 wherein said predictive trend indicator is a predictive trend line.

35. A predictive analysis method according to claim 1 wherein said predictive trend indicator is displayed based upon weighting recent past values of the at least one data type greater than the past values of the at least one data type.

36. A predictive analysis method according to claim 1 wherein the interval of time is a day.

* * * * *